(12) United States Patent
Mathur et al.

(10) Patent No.: US 9,036,235 B2
(45) Date of Patent: May 19, 2015

(54) MECHANICALLY BALANCED OPTICAL MEMBRANE DEVICE FOR ORIENTATION INSENSITIVITY

(75) Inventors: Vaibhav Mathur, Arlington, MA (US); Dale C. Flanders, Lexington, MA (US); Peter S. Whitney, Lexington, MA (US); James W. Getz, Harvard, MA (US)

(73) Assignee: Axsun Technologies, Inc., Billerica, MA (US)

( * ) Notice: Subject to any disclaimer, the term of this patent is extended or adjusted under 35 U.S.C. 154(b) by 181 days.

(21) Appl. No.: 13/467,787

(22) Filed: May 9, 2012

(65) Prior Publication Data

US 2013/0301098 A1    Nov. 14, 2013

(51) Int. Cl.
*G02B 26/08*      (2006.01)
*G02B 26/00*      (2006.01)

(52) U.S. Cl.
CPC .......... *G02B 26/001* (2013.01); *G02B 26/0825* (2013.01)

(58) Field of Classification Search
CPC .............. G02B 26/08; G02B 26/0816; G02B 26/0825; G02B 26/0833; G02B 26/0841
USPC ........................... 359/223.1–226.1, 290, 291, 359/212.1–214.1
See application file for complete search history.

(56) References Cited

U.S. PATENT DOCUMENTS

| | | | |
|---|---|---|---|
| 5,767,666 A | 6/1998 | Asada et al. | |
| 5,999,303 A | 12/1999 | Drake | |
| 5,999,306 A | 12/1999 | Atobe et al. | |
| 6,351,577 B1 | 2/2002 | Aksyuk et al. | |
| 2002/0005979 A1* | 1/2002 | Bartlett et al. | 359/290 |
| 2008/0101748 A1 | 5/2008 | Jilani et al. | |

FOREIGN PATENT DOCUMENTS

WO      01/67171 A2    9/2001

OTHER PUBLICATIONS

International Search Report and Written Opinion of the International Searching Authority mailed Aug. 23, 2013 from counterpart International Application No. PCT/US2013/040384, filed May 9, 2013.
International Preliminary Report on Patentability, mailed Nov. 20, 2014 from counterpart International Application No. PCT/US2013/040384, filed May 9, 2013.

\* cited by examiner

*Primary Examiner* — Euncha Cherry
(74) *Attorney, Agent, or Firm* — Houston & Associates, LLP

(57) ABSTRACT

An optical membrane device comprises a substrate, at least one support block on a surface of the substrate, and at least one plate. A torsion beam supports the plate above the substrate on the support block. The optical membrane device also includes an optical membrane structure supported by the plate above the substrate and at least one electrode on the substrate underneath the plate. In one implementation, the optical membrane device further comprises a tether for coupling the optical membrane structure to the plate. The tether extends between the optical membrane structure and the plate. In another implementation, the substrate of the optical membrane device has an optical port through the substrate directly below the optical membrane structure. The plate is substantially balanced around the torsion beam to minimize a sensitivity to orientation in a gravitational field.

22 Claims, 9 Drawing Sheets

MECHANICALLY BALANCED OPTICAL MEMBRANE DEVICE FOR ORIENTATION INSENSITIVITY

BACKGROUND OF THE INVENTION

MEMS or Micro Electro Mechanical Systems have become useful in a variety of fields. These systems have been applied to such technologies as inkjet printers, accelerometers, microphones, optical switching, and fluid acceleration. Over the last decade, there has been a focus towards the development of a subclass of these devices, termed Micro-Opto-Electro-Mechanical Systems (MOEMS).

One type of MOEMS device is an electrostatically deflectable membrane. Such MOEMS membranes are used in a spectrum of optical applications. For example, they can be coated to be reflective and then paired with a stationary mirror to form a tunable Fabry-Perot (FP) cavity/filter. They can also be used as stand-alone reflective components to define the end of a laser cavity, for example.

Typically, a voltage is applied between the membrane and an adjacent structure. When paired with a second fixed reflector, the FP cavity's separation distance changes through electrostatic attraction as a function of the applied voltage.

There are a few main components that typically make up a MOEMS membrane device. In one example, the MOEMS membrane device includes a handle wafer support structure. An optical membrane or device layer is added to the handle wafer support structure; a deflectable membrane structure is then fabricated in this layer. This MOEMS membrane device includes an insulating layer separating the wafer support structure from the membrane layer. This insulating layer is subsequently partially etched away or otherwise removed to produce the suspended membrane structure in a release process. The insulating layer thickness defines an electrical cavity across which electrical fields are established that are used to electrostatically deflect the membrane structure.

SUMMARY OF THE INVENTION

Existing MEMS membrane devices have problems combatting the gravitational and/or acceleration effects on the membranes' motion and position. For, example, the membranes' rest positions are often influenced by the orientation of the membrane devices in the gravitational field or acceleration in general.

This membrane movement can cause problems in the use of the FP filter, for example, since the absolute size of the filter's cavity determines its passband, which is now dependent on the device's orientation. Some designs have compensated for this gravitational force on the membrane by using a thicker, stiffer membrane having less flexibility. This solution, however, requires higher electrostatic drive voltages.

Thus, there is a need for a MOEMS membrane device having a design that is able to balance the membrane above the substrate and counteract the gravitational or other acceleration.

In general, according to one aspect, the invention features an optical membrane device comprising a substrate, at least one support block on a surface of the substrate, at least one plate, at least one torsion beam that supports the plate above the substrate on the support block, an optical membrane structure supported by the plate above the substrate, and at least one electrode on the substrate underneath the plate.

This configuration can yield a number of advantages. First, this configuration is better able to counteract the gravitational acceleration for a variety of membrane sizes. Also, this configuration need not require as high a voltage as compared to older designs.

In the current embodiment, the optical membrane device further comprises a tether for coupling the optical membrane structure to the plate. The tether extends between the optical membrane structure and the plate. In a further example, at least one portion of the tether is bent at an angle between the plate and the optical membrane structure.

Also in the current embodiment, the substrate of the optical membrane device has an optical port through the substrate directly below the optical membrane structure.

Generally, the plate is substantially balanced around the torsion beam to minimize sensitivity to orientation in a gravitational field.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to similar parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
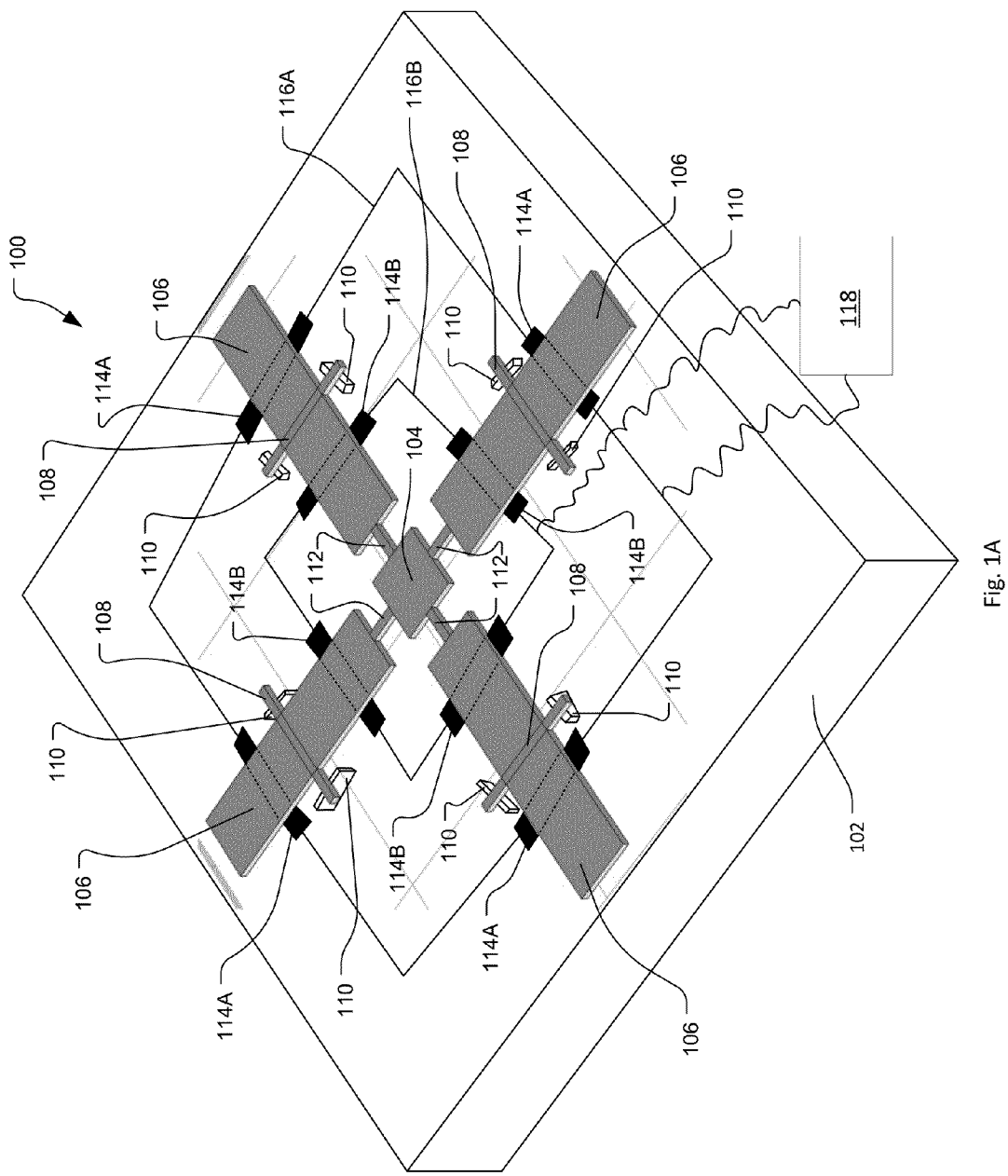
FIG. 1A is a perspective view of an optical membrane device according to an embodiment of the invention.

FIG. 1A shows an optical membrane device 100 that has been constructed according to the principles of the present invention.

The optical membrane device 100 includes a substrate 102. The substrate 102 functions as a support structure for the other components of the optical membrane device 100.

In one example, the substrate 102 is made from a handle wafer. In a further detail, the wafer is a standard n-type doped silicon wafer. The thickness of the substrate 102 is about 100 to about 1,000 micrometers, in one example.

The optical membrane device 100 further includes a patterned device layer that includes an optical membrane structure 104 supported above the substrate 102. The device layer and particularly the optical membrane structure 104 are made from silicon or a silicon compound in one example, such as silicon nitride, polycrystalline silicon, or single crystal silicon. In one example, the optical membrane structure 104 has a thickness between about 5 and about 20 micrometers. Such thickness range provides adequate structural integrity while not making the structure overly rigid. In the illustrated example, the optical membrane structure 104 has a square shape.

The device layer of the optical membrane device 100 also includes four or more plates 106 supported above the substrate 102 and coupled to the optical membrane structure 104. Alternatively, the optical membrane device 100 can include only one plate 106 or two plates 106. Each plate 106 is attached to one of the four sides of the optical membrane structure 104. The plates 106 can be made from the same material as the optical membrane structure 104, being typically patterned from the same device layer. In the illustrated example, each plate 106 is substantially rectangular-shaped.

Each plate 106 has a torsion beam 108 extending across the plate 106 for supporting the plate 106 and optical membrane structure 104 above the substrate 102. In an alternative example, the torsion beam 108 is configured as two smaller sections that form separate arms protruding out of the plate 106 on either side. Often the torsion beam 108 and the corresponding plate 106 are fabricated by patterning the device layer that has been deposited or attached to the substrate 102.

Figure 2:
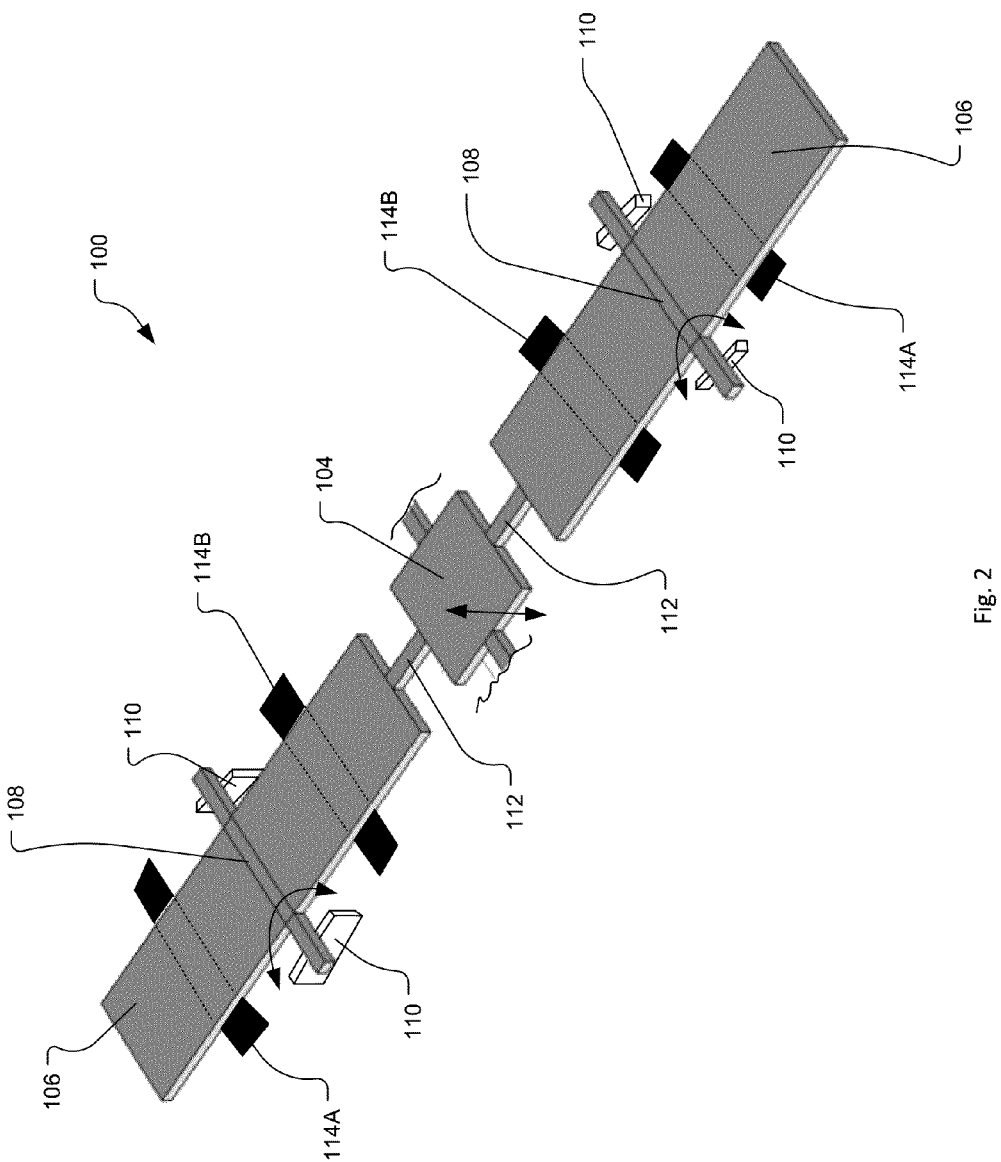
FIG. 2 is a perspective view of a portion of the optical membrane device of FIG. 1A showing the movement (via arrows) of the plates and optical membrane structure when voltage is applied to the electrodes.

The plates 106 are supported above the substrate 102 with support blocks 110. Pairs of support blocks are positioned on the substrate underneath the end portions of each torsion beam 108. The torsion beam 108 supports the respective plate 106 on the support blocks 110 so as to enable the plate 106 to move in a seesaw motion as shown in FIG. 2. In the alternative example, the two small protruding sections that form the torsion beam sit on the respective support blocks in supporting the plate.

Each plate 106 is preferably coupled to the membrane structure 104 by respective tethers 112, which are also fabricated by patterning the device layer. Alternatively, each plate can be directly coupled to the membrane without tethers, however.

In the FIG. 1A example, each tether 112 extends from the plate 106 to one of the sides of the membrane structure 104. Via the tethers 112, the plates 106 provide restoring torque to offset gravitational forces pulling the membrane structure 104 downwards thereby preventing the membrane structure 104 from deflecting. Additionally, the tethers 112 translate the seesaw motion of the plates 106 to the membrane structure 104. This translation causes the membrane structure 104 to move up and down as shown in FIG. 2.

Figure 1B:
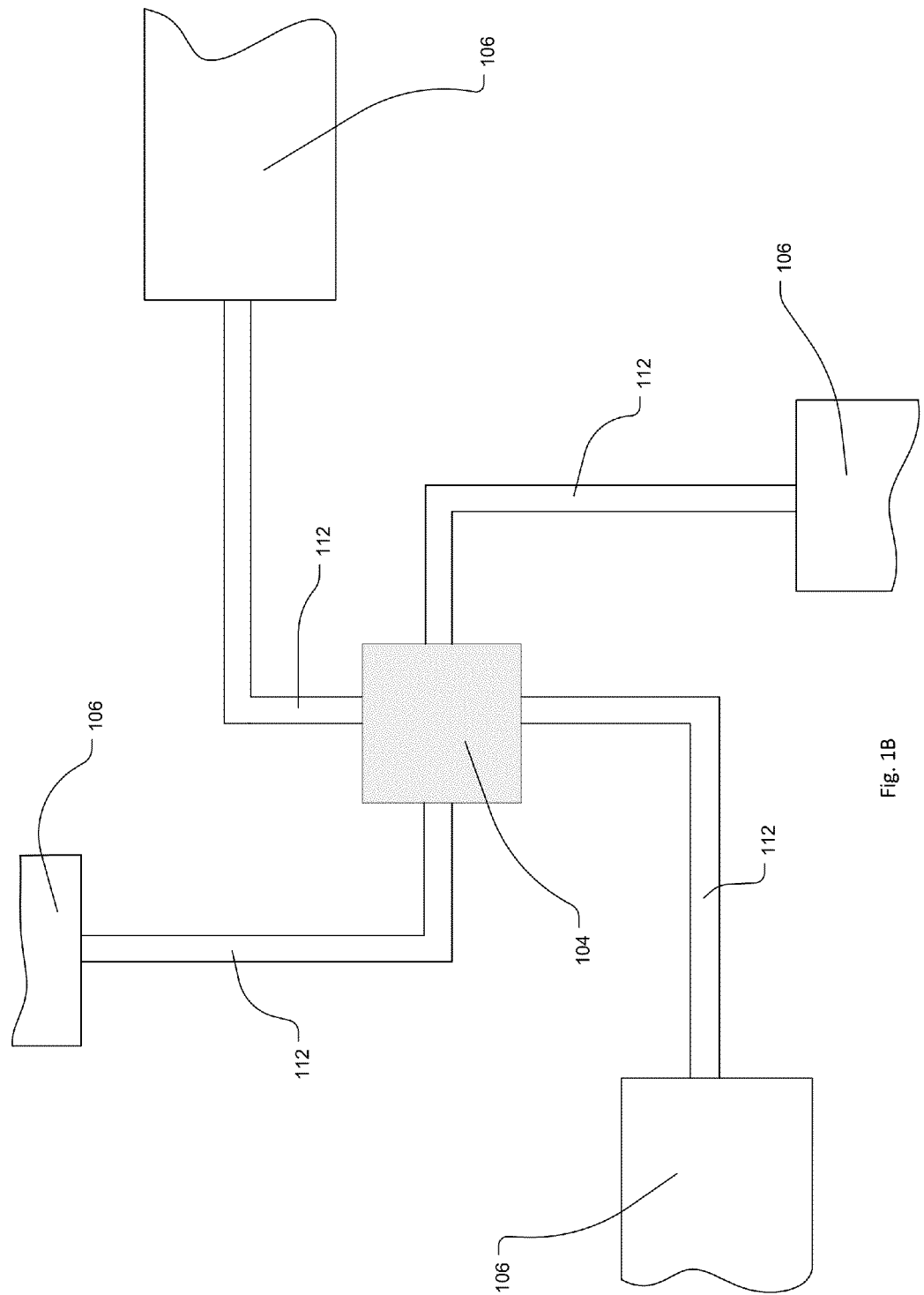
FIG. 1B is a partial view of the device layer portion of the optical membrane device showing an alternative embodiment of the tethers having an angle between each plate and the optical membrane structure.

FIG. 1B shows an alternative embodiment of the device layer and specifically in the configuration of the tethers 112. In this example, the tethers 112 include an angle or bend at a position between where the tether 112 is coupled to the plate 106 and where the tether 112 is coupled to the membrane structure 104. This bend along each tether is not limited to a certain degree angle. The example in FIG. 1B shows an angle of about 90 degrees. This bend or angle along the tether 112 avoids over-constraining the movement of the membrane structure 104.

The illustrated design can be compensated so as to reduce or eliminate its sensitivity to its orientation in the gravitational field or due to acceleration. This is achieved by locating the torsion beams 108 on the plates 106 so that the mass on either side of the plate 106 taking into account the distance from the beams is equal or they are balanced, such that the body load/weight of the plates is equal on both sides of the torsion beam center axis. In more detail, the mass of each of the plates 106 on the outer side of the torsion beam 108 is equal to the mass on the inner side of the plates 106 plus the mass contribution from the tether 112 and the portion of the optical membrane structure 104 that is supported by that plate 106 taking into account the distance of the mass from the beams (fulcrum). The optical membrane device 100 preferably includes two electrostatic electrodes 114A-B positioned below each plate 106. Alternatively, only one electrode can be positioned below each plate.

In the FIG. 1A example, a first electrostatic electrode 114A is positioned under the outer side of the torsion beam 108 and a second electrostatic electrode 114B is positioned under the opposite inner side of the torsion beam 108.

In one implementation, the first electrodes 114A are connected to each other by wiring 116A and the second electrodes 114B are connected to each other by wiring 116B.

The first electrode wiring 116A and second electrode wiring 116B are connected to an electrostatic driver 118, which is typically external to the optical membrane device 100. The electrostatic driver 118 provides a voltage to the electrodes 116A-B.

An electrostatic field is generated in the space between the electrodes 114A-B and underside of the plates 106.

As designated by the arrows in FIG. 2, when the voltage is applied by the electrostatic driver 118 alternately to the electrostatic electrodes 114A-B, the plates 206 move in a see-saw motion about the torsion beam 108. This see-saw motion is translated to the optical membrane structure 104 causing it to move up and down with respect to the substrate 102.

In other embodiments, there are separate electrical connections between the driver 118 and each of the electrodes 114A, 114B such that a different drive voltage can be applied to each electrode and thus each plate 106 separately. This allows for the unbalanced driving or tilting of the membrane structure 104 in addition to in-plane deflection. It can also be used to compensate for manufacturing imperfections that yield a tilt in the final manufactured device.

Figure 3:
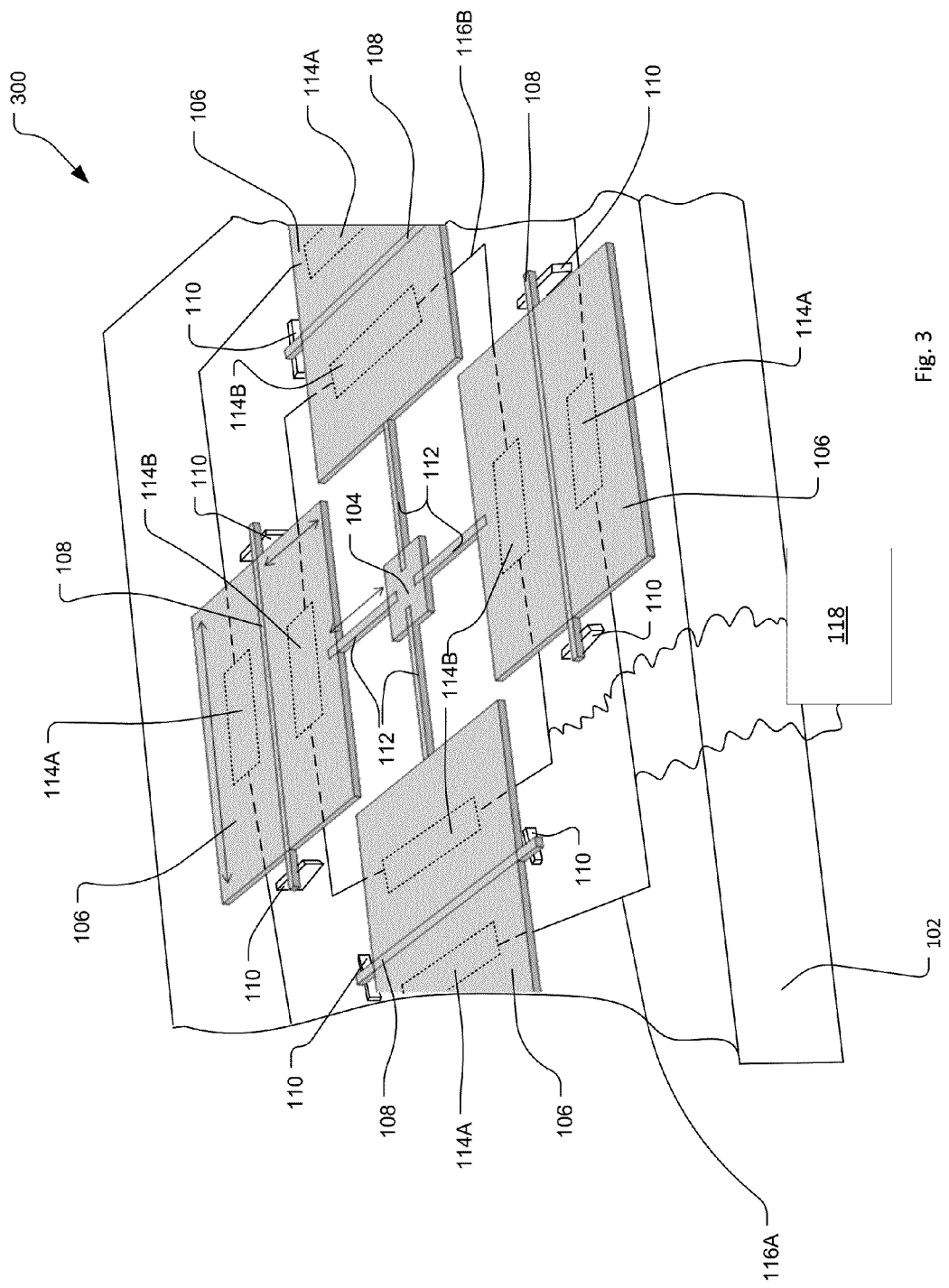
FIG. 3 is a perspective view of a portion of the optical membrane device in an alternative embodiment of the invention.

FIG. 3 is an alternative embodiment of the optical membrane device 100 of FIG. 1A. This second optical membrane device 300 has wider plates 106 including longer torsion beams 108 extending across the plates 106. Thus, each plate is substantially square-shaped. Also, the torsion beams 108 have a narrower width and the tethers 112 are longer as compared to the optical membrane device 100 in FIG. 1A. This change in dimensions can lead to lower actuation voltage. Also, this can allow for increased linear stiffness thus reducing the linear motion of the membrane structure 104 caused by gravitational acceleration.

Figure 4:
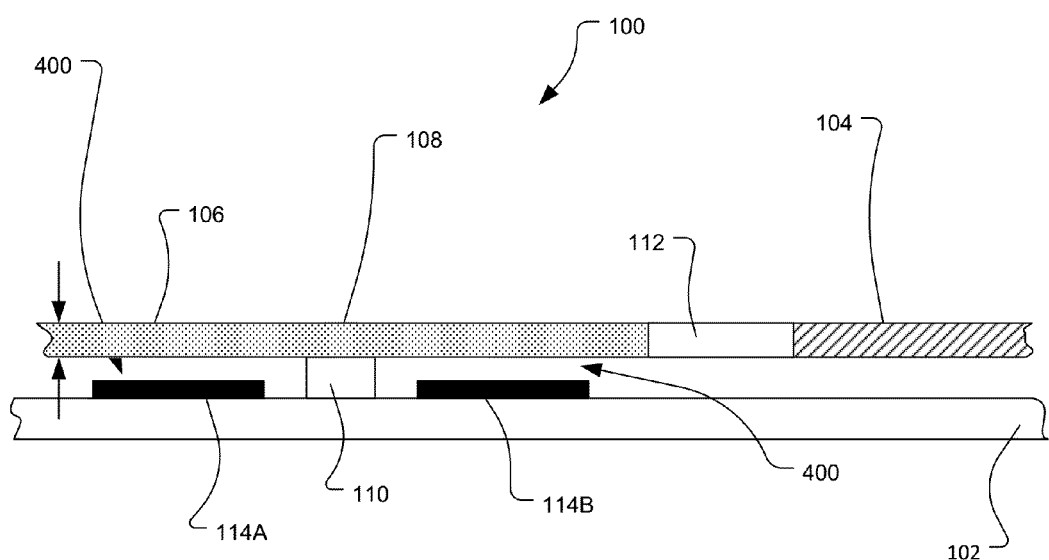
FIG. 4 is a cross-sectional side view of the optical membrane device according to an embodiment of the invention.

FIG. 4 is a cross-sectional view of the optical membrane device 100. This shows the electrostatic cavity 400 between the electrostatic electrodes 114A-B and one the plates 106. This also shows generally how each support block 110 is positioned to mechanically support the plate 106, tether 112, and membrane structure 104 above the substrate 102.

Figure 5:
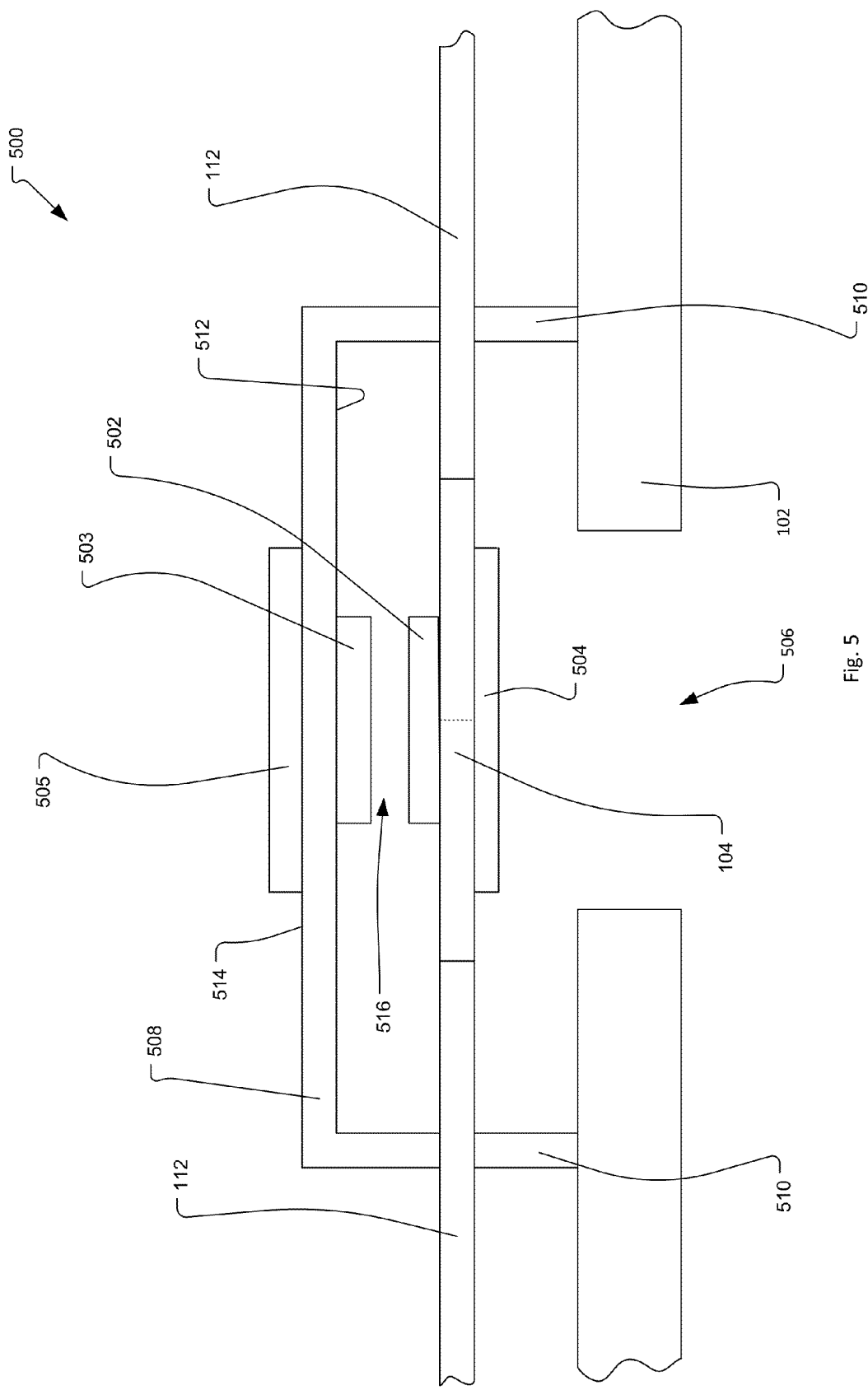
FIG. 5 is a diagonal cross-sectional view of a central portion of the optical membrane device showing the optical membrane between a fixed mirror substrate and the substrate to produce a Fabry-Perot filter according to an embodiment of the invention.

FIG. 5 is a close-up cross-sectional view of a central portion 500 of the optical membrane device 100 when used as a deflectable membrane in an FP filter.

The central portion 500 includes the optical membrane structure 104 positioned by tethers 112 over a central section of the substrate 102.

The optical membrane structure 104 includes a High Reflectance (HR) coating 502 on its top surface and an anti-reflective (AR) coating 504 on the membrane's bottom surface. The high reflectance coating 502 is highly reflecting, but has low absorption properties that are desirable for high finesse Fabry-Perot filters for example. The AR coating is used to minimize reflection on the bottom of the membrane structure 104.

The central portion 500 includes an optical port 506 that extends through the center of the substrate 102. In an alternative implementation, no optical port is provided through the substrate. The optical port 506 enables direct optical access to the optical membrane structure 104 through the substrate 102 without having to traverse through the substrate material.

The central portion 500 includes a fixed mirror substrate 508 that fits over the top of the optical membrane structure 104. The fixed mirror substrate 508 includes a pillar 510 that contacts the substrate surface for supporting the fixed mirror substrate 508 above the substrate 102.

The fixed mirror substrate 508 includes an inner surface 512 facing the membrane structure 104 and an outer surface 514 facing an external environment. The center of the inner surface 512 is coated with a high reflectance coating 503 positioned over the high reflectance coating 502 of the membrane structure 104. The center of the outer surface 514 is coated with an anti-reflective coating 505 positioned opposite to the high reflectance coating 503 on the inner surface 512.

The central potion 500 includes an optical cavity 516. The optical cavity 516 extends between the fixed mirror substrate 508 and the membrane structure 104 particularly between the two high reflectance coatings 502/503.

Figure 6:
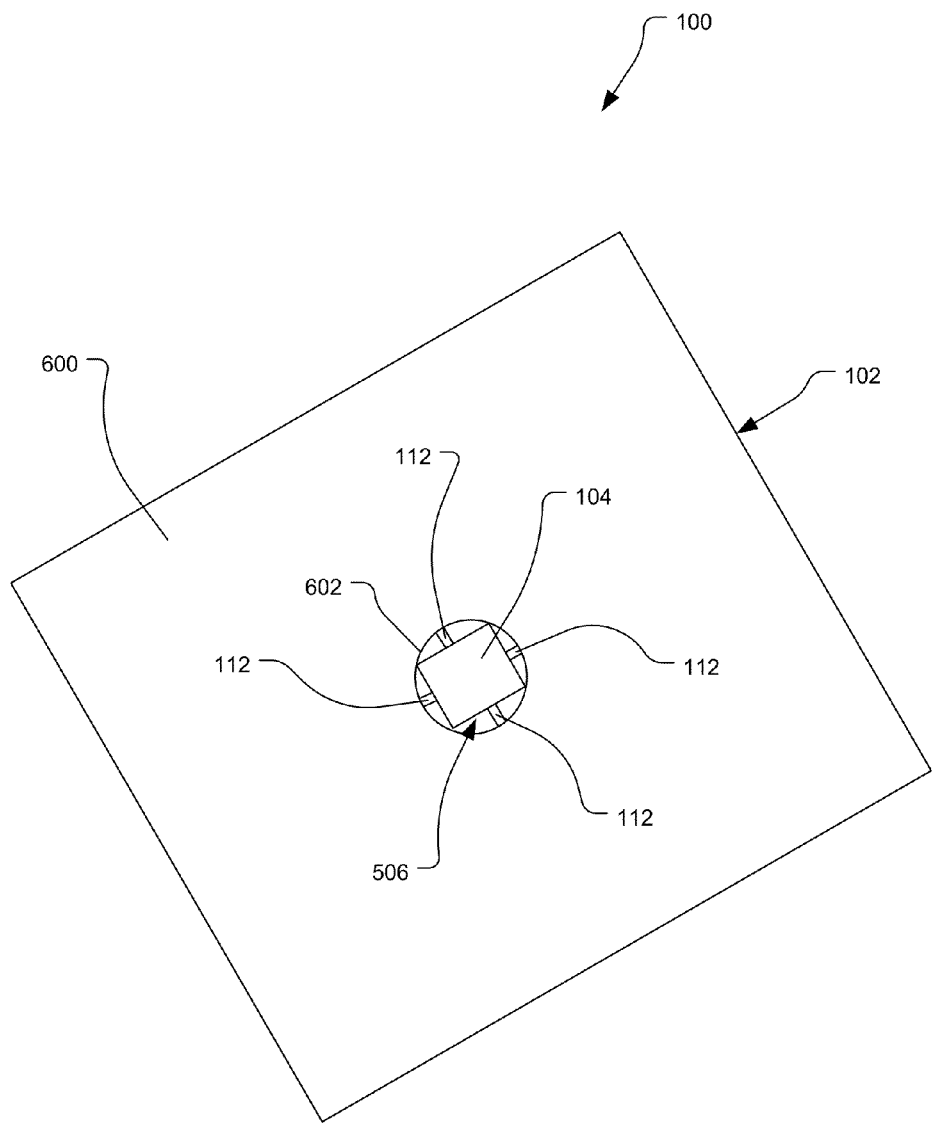
FIG. 6 is a bottom view of the optical membrane device showing the backside optical port opening on the bottom of the substrate according to an embodiment of the invention.

FIG. 6 shows the bottom of the optical membrane device 100. The bottom surface 600 of the substrate 102 includes the optical port 506 formed through the substrate 102 for enabling optical access to the optical membrane structure 104 from the bottom 600 of the optical membrane device 100. The optical port 506 extends from a port opening 602 in the substrate bottom 600 to the optical membrane structure 104. In one example, the optical port 506 can have inwardly sloping side walls that end at the port opening 602.

In operation, the FP filter can in effect be turned off and on. This is accomplished by tilting the membrane structure 104 out of parallelism with the fixed mirror substrate 508 using the unbalanced driving technique describe previously. This tilting spoils the Fabry-Perot cavity and thus converts the device from a bandpass filter to a mirror.

Figure 7A:
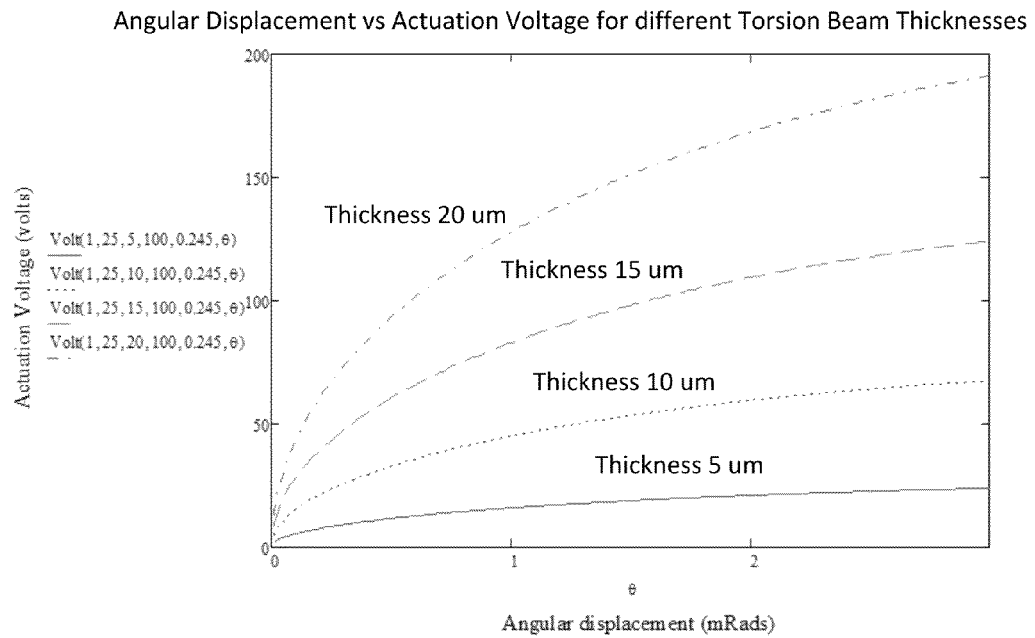
FIG. 7A is a graph of angular displacement for different torsion beam thicknesses versus actuation voltage.

FIG. 7A is a graph of angular displacement for different torsion beam thicknesses versus actuation voltage according to an embodiment of the invention. As the thickness of the torsion beam increases from about 5 micrometers to about 20 micrometers, the angular displacement becomes closer to exponential for voltages between 0 and 200 volts. For example, a torsion beam having a thickness of 5 micrometers has very little angular displacement difference for voltages between 0 volts and 200 volts. However, a torsion beam having a thickness of 20 micrometers has an angular displacement that increases about exponentially between 0 volts and 200 volts.

Figure 7B:
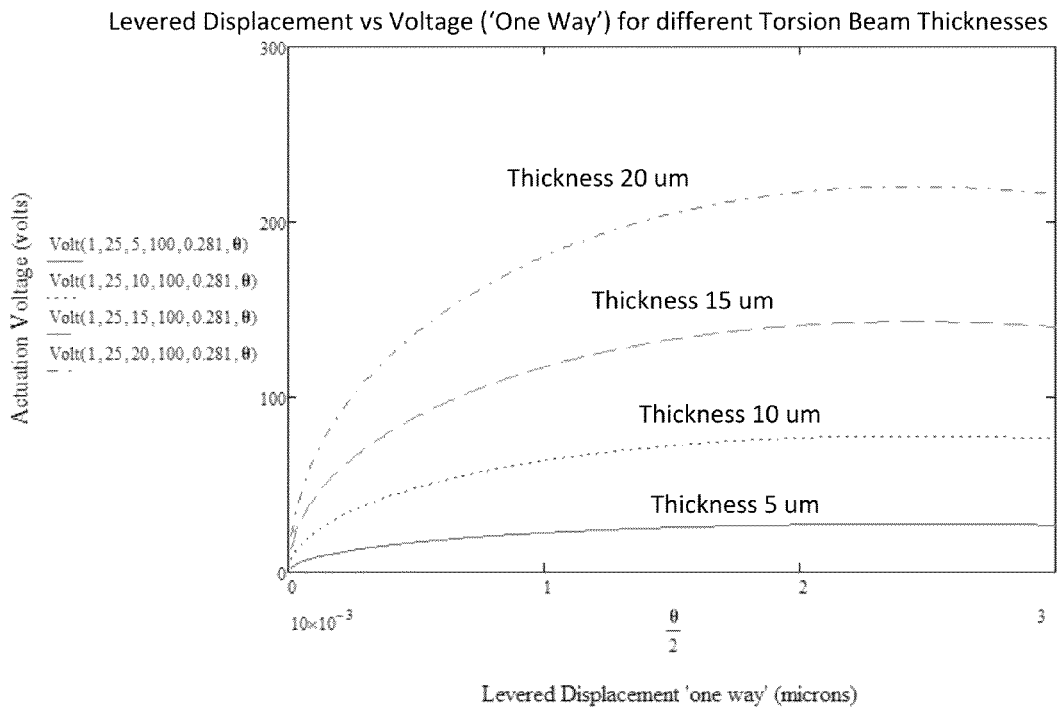
FIG. 7B is a graph of levered displacement for different torsion beam thicknesses versus voltage ('one way').

FIG. 7B is a graph of levered displacement for different torsion beam thicknesses versus voltage ('one way, i.e. total scan length either up or down direction') according to an embodiment of the invention. In this example, as shown in FIG. 7B, a thicker beam requires more voltage to produce the same leverage. For example, a torsion beam having a thickness of 5 micrometers requires very little voltage to produce the same leverage, as compared to a 20 micron thick beam, which requires up to 200 volts to produce the same leverage.

Figure 8:
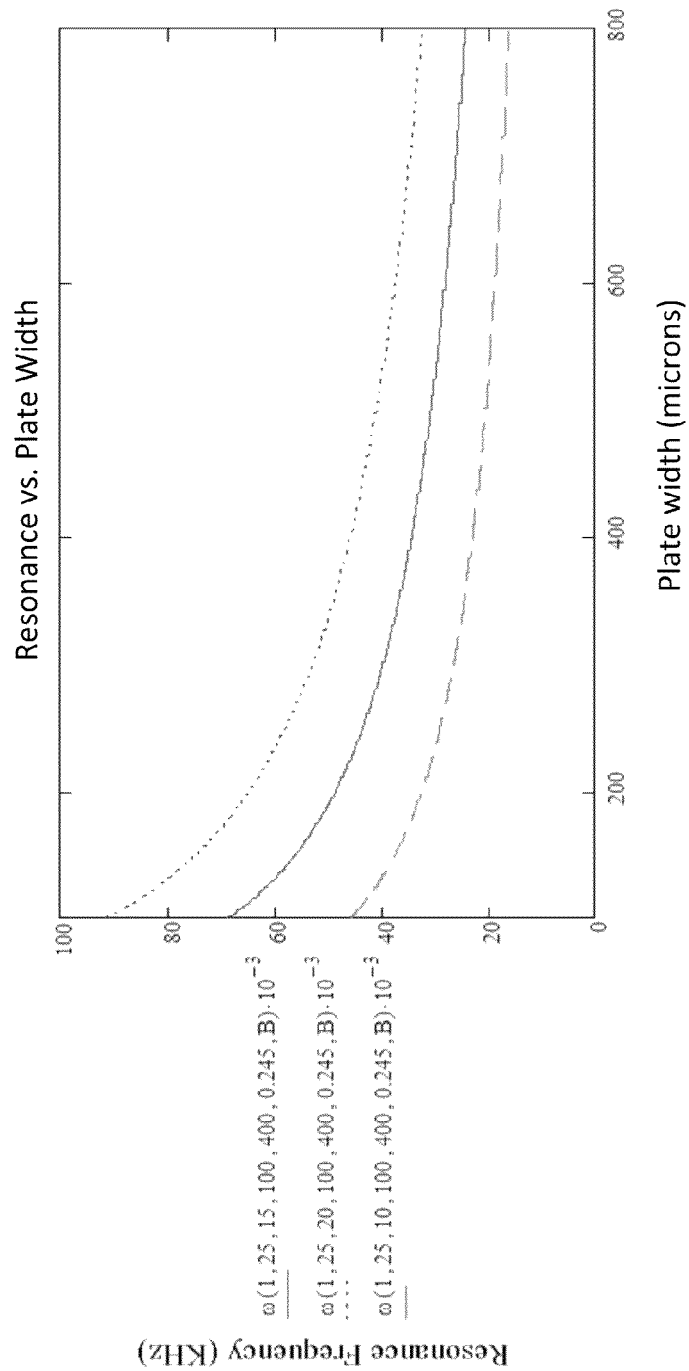
FIG. 8 is a graph of resonance versus plate width.

FIG. 8 is a graph of resonance versus plate width according to an embodiment of the invention. This graph shows that for different designs, the resonance frequency decreases exponentially between a plate width of about 0 and 800 micrometers. Although each design starts and ends at different resonance frequency levels, the function of the curve is about the same for each design.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical membrane device comprising:
   a substrate;
   support blocks on a surface of the substrate;
   plates;
   torsion beams that support the plates above the substrate on the support blocks to enable the plates to move in a seesaw fashion;
   an optical membrane structure supported by the plates above the substrate; and
   at least one electrode on the substrate for electrostatic drive of the optical membrane structure up and down with respect to the substrate.

2. The optical membrane device of claim 1 further comprising tethers for coupling the optical membrane structure to the plates, wherein each of the tethers extend between the optical membrane structure and the respective plates.

3. The optical membrane device of claim 1 further comprising an electrostatic driver for providing a voltage to the electrode.

4. The optical membrane device of claim 1 wherein the electrode is an electrostatic electrode.

5. The optical membrane device of claim 1 wherein the plates are substantially rectangular-shaped.

6. The optical membrane device of claim 1 wherein the plates are substantially square-shaped.

7. The optical membrane device of claim 1 wherein the substrate has an optical port through the substrate directly below the optical membrane structure.

8. The optical membrane device of claim 7 further comprising inwardly sloping side walls surrounding the optical port.

9. The optical membrane device of claim 1 wherein the optical membrane structure has a top face and a bottom face facing the substrate surface, the membrane structure further comprises an anti-reflective coating on the bottom face and a high reflectance coating on the top face.

10. The optical membrane device of claim 9 further comprising a fixed mirror substrate positioned over the top face of the optical membrane structure to form an optical cavity between the top face of the membrane structure and the fixed mirror substrate.

11. The optical membrane device of claim 10 wherein the fixed mirror substrate further comprises an inner surface facing the optical membrane structure and outer surface, the optical membrane device further comprising a high reflectance coating on the inner surface of the fixed mirror substrate and an anti-reflective coating on the outer surface of the fixed mirror substrate.

12. The optical membrane device of claim 10 wherein the fixed mirror substrate further comprises a pillar for supporting the fixed mirror substrate above the optical membrane structure.

13. The optical membrane device of claim 1 further comprising at least one more electrode on the substrate underneath the plates, wherein one electrode is positioned on one side of each of the torsion beams and the additional electrode is positioned on the opposite side of each of the torsion beams with respect to the first electrode.

14. The optical membrane device of claim 1 wherein the optical membrane device is used in a Fabry-Perot filter device.

15. The optical membrane device of claim 1 wherein the torsion beams each include a pair of arms protruding out of the plates to the support blocks.

16. The optical membrane device of claim 1 wherein the substrate is a handle wafer material.

17. The optical membrane device of claim 16 wherein the handle wafer material is a standard n-type doped silicon wafer.

18. The optical membrane device of claim 1 wherein the substrate includes a thickness between about 100 micrometers to about 1,000 micrometers.

19. The optical membrane device of claim 1 wherein the optical membrane structure is a silicon material.

20. The optical membrane device of claim 1 wherein the optical membrane structure has a thickness between about 5 micrometers and about 20 micrometers.

21. The optical membrane device of claim 1 wherein the plates are substantially balanced around the respective torsion beams to minimize a sensitivity to orientation in a gravitational field.

22. The optical membrane device of claim 2 wherein at least one portion of each of the tethers is bent at an angle between the plates and the optical membrane structure.

* * * * *